F. R. GRIDLEY.
Spring Plate Washers.
No. 138,149. Patented April 22, 1873.
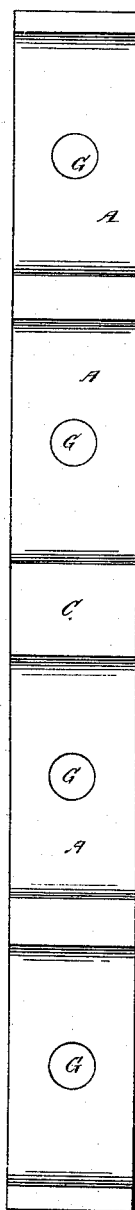
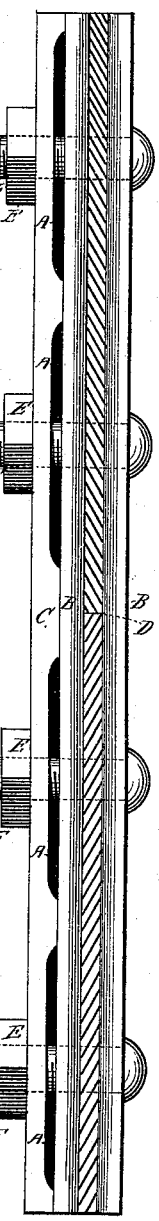
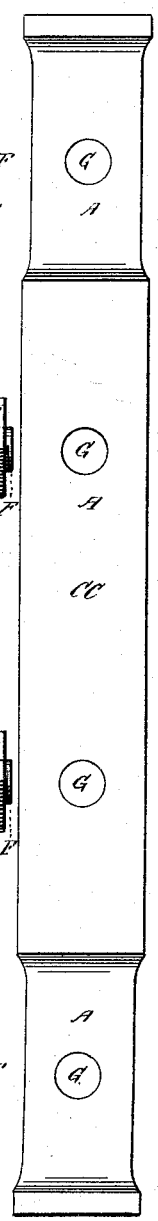
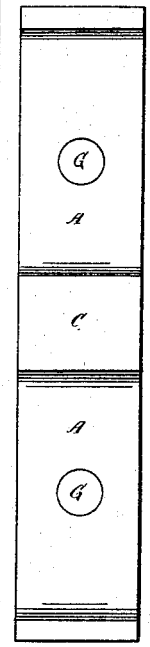
Witnesses:
Inventor:

UNITED STATES PATENT OFFICE.

FAYETTE R. GRIDLEY, OF ST. PAUL, MINNESOTA, ASSIGNOR OF ONE-HALF HIS RIGHT TO THOMAS JORDAN, OF INDIANAPOLIS, INDIANA.

IMPROVEMENT IN SPRING-PLATE WASHERS.

Specification forming part of Letters Patent No. 138,149, dated April 22, 1873; application filed January 15, 1872.

*To all whom it may concern:*

Be it known that I, FAYETTE R. GRIDLEY, of the city of St. Paul, county of Ramsey and State of Minnesota, have invented a certain Improvement in a Sectional Spring-Plate Washer, which plate and washers combined will be found of great value in any application, where the expansion and contraction of metals should be accommodated in order to preserve the screw-threads of bolts and nuts, and more especially so in bolting railroad rails, of which the following is a description:

Nature and Object of the Invention.

My invention relates to a solid sectional spring-plate washer, which is composed of one integral piece, the elastic or spring portion of which is distributed into any suitable number of sections to accommodate any number of bolts, each bolt being provided with at least one spring or elastic section, and the whole plate being one integral piece unlike separate or individual elastic or non-elastic washers. This improved sectional spring plate-washer adds strength to the joint according to the amount of iron or other metals used in the same. It will also prevent screw-threads on bolts and nuts from being stripped and spoiled by the expansion and contraction of metals; and it will enable the parties when turning on the nuts to discern when the nut is sufficiently turned onto the bolt, which also prevents the screw-threads from being stripped and spoiled by too hard pressure with the wrench; and the said improved sectional spring-plate washers, when made of a good article of iron, will be cheaper than the individual spring or elastic washers now in use.

Description of the Accompanying Drawing.

Figure 1 shows a solid sectional spring-plate washer containing two spring or elastic washer sections. Fig. 2 shows the same as Fig. 1, only differing in form to accommodate the irregular arching shape of the side of a railroad rail when applied directly to and adjoining said rail. Fig. 3 shows a joint, composed of Fig. 1 and Fig. 2, in connection with one fish-plate shown by letter B, which join together two bars or beams shown by letter D. Fig. 4 shows, probably, a more perfect joint, including my improvement. Fig. 5 shows the sectional spring-plate washer in a side view.

General Description.

C, in Fig. 4, is an edge view of my improved sectional spring-plate washer, with which, in connection with two fish-plates shown by letter B, two bars or beams shown by letter D are bolted together, though not screwed up tight enough to show any spring-pressure on the sectional parts of the sectional spring-plate washers, the nuts E on the bolts F only being turned on close up to the plate-washers C. This improved sectional spring-plate washer should be substantially constructed, so as to accommodate the expansion and contraction of the metals, and thereby save the screw-threads on the bolts and nuts from being stripped by this action of metal or by undue forcing of the nuts against the plates, and at the same time hold the joints in railroad rails, or other joints where such plates are applicable, sufficiently firm for all practical purposes. Letter A shows the hollow or slot-like opening in the improved sectional spring-plate washer C, which opening admits of the plate C, at the sectional point, being sprung in directly behind or opposite the nut E on the bolt F about one and a half sixteenths of an inch, more or less, as necessity may require, and at the same time leaving about the sixteenth of an inch or more space, sufficient to accommodate the expansion and contraction of metals, while the pressure, which springs this plate C in, as above mentioned, will firmly hold the joints sufficiently stiff to make a succession of railroad rails thus bolted together to virtually make a continuous rail, which joint part will, when thus constructed and put together, allow heavy and rapid passing trains of cars to pass over as smoothly as over any part of the solid rails. The continual pressure of the spring-sections of the plate C will be sufficiently firm in their pressure against the nuts E on the bolts F to keep the nuts firm and tight. Letter G shows the bolt-holes in the improved sectional spring-plate washers.

The most distinguishing characteristic of my spring-plate washer, as compared with the ordinary separate spring-washer, is that it adds strength to the joint in proportion to the metal employed, so that when used in connection with rail-joints the fish-plates thereof may be made considerably lighter. The spring-plate washer may also be made of sufficient strength to take the place of one of the usual splice-pieces or fish-plates, as indicated in Fig. 3.

I claim as my invention—

1. In a fish-joint or other similarly-constructed joint, the combination, with the splice-pieces and bolts and nuts, of the spring-plate washer C, substantially as and for the purposes set forth.

2. A fish-joint or other similarly-constructed joint, consisting of solid plate B and recessed spring-plate C bolted to the rails or beams D, substantially as specified.

3. As a new article of manufacture, a spring-plate washer, C, constructed substantially as herein set forth.

FAYETTE R. GRIDLEY.

Witnesses:
 HARVEY OFFOCER,
 A. MESSER.